(12) United States Patent
DeCorte

(10) Patent No.: US 10,721,009 B2
(45) Date of Patent: Jul. 21, 2020

(54) VIRTUALIZED CLOCKS

(71) Applicant: Accedian Networks Inc., Saint-Laurent (CA)

(72) Inventor: Thierry DeCorte, Laval (CA)

(73) Assignee: Accedian Networks Inc., Saint-Laurent (CA)

(*) Notice: Subject to any disclaimer, the term of this patent is extended or adjusted under 35 U.S.C. 154(b) by 261 days.

(21) Appl. No.: 15/353,945

(22) Filed: Nov. 17, 2016

(65) Prior Publication Data

US 2018/0139034 A1    May 17, 2018

(51) Int. Cl.
*H04J 3/06* (2006.01)
*H04L 29/06* (2006.01)

(52) U.S. Cl.
CPC ............ *H04J 3/0667* (2013.01); *H04L 69/00* (2013.01)

(58) Field of Classification Search
None
See application file for complete search history.

(56) References Cited

U.S. PATENT DOCUMENTS

| | | | | |
|---|---|---|---|---|
| 5,636,373 A * | 6/1997 | Glendening | ............... | G06F 1/04 713/400 |
| 6,069,887 A * | 5/2000 | Geiger | .................. | H04J 3/0664 370/338 |
| 6,104,729 A * | 8/2000 | Hellum | ................. | H04J 3/0644 370/252 |
| 6,751,163 B1 * | 6/2004 | Miyakawa | ............. | G04R 20/24 368/46 |
| 7,188,060 B1 * | 3/2007 | Adcock | ..................... | G06F 1/12 703/14 |
| 8,559,412 B1 * | 10/2013 | Nicholls | ........... | H04W 56/0015 370/350 |
| 9,547,332 B1 * | 1/2017 | Mizrahi | ................. | H04J 3/0682 |
| 10,498,475 B1 * | 12/2019 | Devineni | ............... | H04J 3/0644 |
| 2002/0018402 A1 * | 2/2002 | Egle | ......................... | G04G 7/00 368/46 |
| 2003/0093705 A1 * | 5/2003 | Kriz | .......................... | G06F 1/14 713/600 |
| 2003/0101365 A1 * | 5/2003 | Elko | ......................... | G06F 1/14 713/500 |
| 2004/0133390 A1 * | 7/2004 | Osorio | ................. | A61B 5/0006 702/178 |
| 2004/0203951 A1 * | 10/2004 | Mazzara, Jr. | ............. | G06F 1/14 455/466 |
| 2005/0237093 A1 * | 10/2005 | Wilhite | .................. | H03K 5/133 327/158 |
| 2007/0035288 A1 * | 2/2007 | Washizu | ............ | G01R 31/3191 324/76.52 |

(Continued)

*Primary Examiner* — Ayaz R Sheikh
*Assistant Examiner* — Faiyazkhan Ghafoerkhan
(74) *Attorney, Agent, or Firm* — Stratford Managers Corporation

(57) ABSTRACT

A method of virtualizing a clock is executed by a network controller comprising a processor and computer-readable instructions for creating one or more virtual network elements comprising one or more virtual clocks. The method comprises retrieving, at a first virtual network element of the one or more virtual network elements, a first time of day value and a second time of day value. The method further comprises adjusting the amount of time elapsed based, in part, on a frequency adjustment value and incrementing a clock value based on the amount of time elapsed.

14 Claims, 6 Drawing Sheets

(56) References Cited

U.S. PATENT DOCUMENTS

| | | | | |
|---|---|---|---|---|
| 2007/0035289 A1* | 2/2007 | Washizu | ............ | G01R 31/3191 324/76.77 |
| 2007/0052427 A1* | 3/2007 | Washizu | ............ | G01R 31/3191 324/622 |
| 2009/0109954 A1* | 4/2009 | Laulainen | ................ | G04G 7/00 370/350 |
| 2009/0175258 A1* | 7/2009 | Wang | ...................... | H04J 13/00 370/347 |
| 2010/0118895 A1* | 5/2010 | Radulescu | ............... | G04G 7/00 370/503 |
| 2011/0128856 A1* | 6/2011 | Won | .................... | H04L 41/5019 370/237 |
| 2011/0286560 A1* | 11/2011 | Pignatelli | .............. | H04J 3/0655 375/356 |
| 2014/0019964 A1* | 1/2014 | Neuse | ................ | G06F 9/45533 718/1 |
| 2014/0029604 A1* | 1/2014 | Nicholls | ........... | H04W 56/0015 370/350 |
| 2014/0119462 A1* | 5/2014 | Wei | ...................... | H04J 3/0638 375/257 |
| 2015/0163756 A1* | 6/2015 | Hildebrandt | .......... | H04W 56/00 370/350 |
| 2016/0034332 A1* | 2/2016 | Sato | .................... | G06F 11/1629 714/49 |
| 2016/0371063 A1* | 12/2016 | Chiosi | ................. | H04L 41/5048 |
| 2017/0223646 A1* | 8/2017 | Romera | ............... | G06F 13/4273 |
| 2017/0302392 A1* | 10/2017 | Farra | .................... | H04J 14/021 |
| 2019/0056972 A1* | 2/2019 | Zhou | ........................ | G06F 9/54 |

* cited by examiner

VIRTUALIZED CLOCKS

FIELD OF THE INVENTION

The present disclosure relates to network virtualisation and, specifically to clock virtualisation.

BRIEF SUMMARY

In one aspect, the present invention is directed to a method of virtualizing a clock, the method executed by a network controller comprising a processor and computer-readable instructions for creating one or more virtual network elements comprising one or more virtual clocks. The method comprises retrieving, at a first virtual network element of said one or more virtual network elements, a first time of day value and a second time of day value. The method further comprises adjusting the amount of time elapsed based, in part, on a frequency adjustment value and incrementing a clock value based on the amount of time elapsed.

In another aspect, the present invention is directed to a system for virtualizing a clock, the system comprising a network controller comprising a processor and computer-readable instructions executed by the processor for creating one or more virtual network elements. Each virtual network element of the system comprises a virtual clock adapted to retrieve a first time of day value and a second time of day value. The virtual clock is further adapted to calculate an amount of time elapsed between the first time of day value and the second time of day value. The virtual clock is further adapted to adjust the amount of time elapsed based, in part, on a frequency adjustment value and increment a clock value based on the amount of time elapsed.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
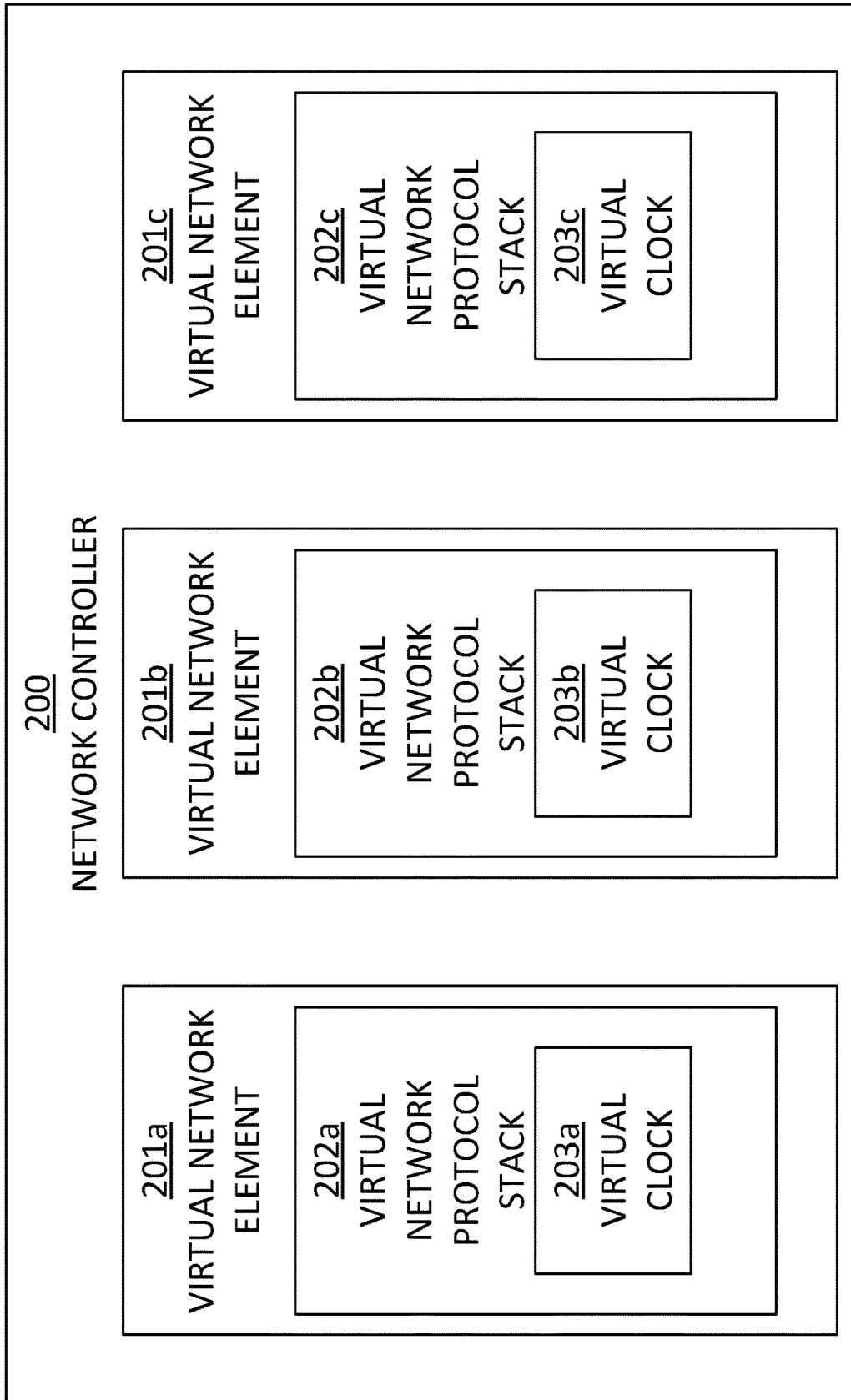
FIG. 1 depicts a network.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

BACKGROUND

Due to several known phenomena, clocks are subject to "clock drift" where a clock will fail to run at the same rate as a reference clock. Because of this, there is an established need for clock synchronization protocols that synchronize clocks (referred to as herein as "slave clocks") with a reference clock (referred to herein as a "master clock"). One such protocol is the Precision Time Protocol ("PTP") which was originally defined in the IEEE 1588-2002 standard and revised in the IEEE 1588-2008 standard.

Synchronization is achieved by running software (referred to as "synchronization protocols") on network elements with master clocks and network elements with slave clocks. The synchronization protocols function to transmit and receive synchronization data. However, due to advances in network virtualization, there exists a need a de-couple clocks from network elements.

DETAILED DESCRIPTION

FIG. 1 depicts an example of a virtualized network 100. In FIG. 1, the network controller 200 is used to generate virtual network element 201a, 201b, 201c that create a virtualized network. Although the diagram only depicts three virtual network elements for simplicity, in practice the network controller 200 could generate hundreds or thousands of virtual network elements. In addition, the network 100 could comprise multiple network controllers 200.

Depending on the embodiment, the virtual network elements 201a, 201b, 201c may be implemented using operating-system level virtualization (e.g., software containers) or other methods of virtualization. Each virtual network element 201a, 201b, 201c executes a virtual network protocol stack 202a, 202b, 202c that either partially or fully replicates the behavior of a network element (e.g., a network server). In additional to virtualized network elements, in some embodiments, the virtualized network 100 may contain one or more non-virtual network elements (e.g., servers or other hardware, not shown) running non-virtual network stacks. Depending on the embodiment, the virtualized network 100 may comprise one or more network segments.

The present invention is directed to a virtual clock 203a, 203a, 203c that is implemented in the virtual network protocol stacks 202a, 202b, 202c of virtual network elements 201a, 201b, 201c. The virtual clocks 203a, 203a, 203c described herein are lightweight and computationally inexpensive. Accordingly, the virtual clocks 203a, 203a, 203c can be implemented simultaneously in thousands of virtual network elements 201a, 201b, 201c without compromising efficiency or using excessive computational resources.

Figure 2:
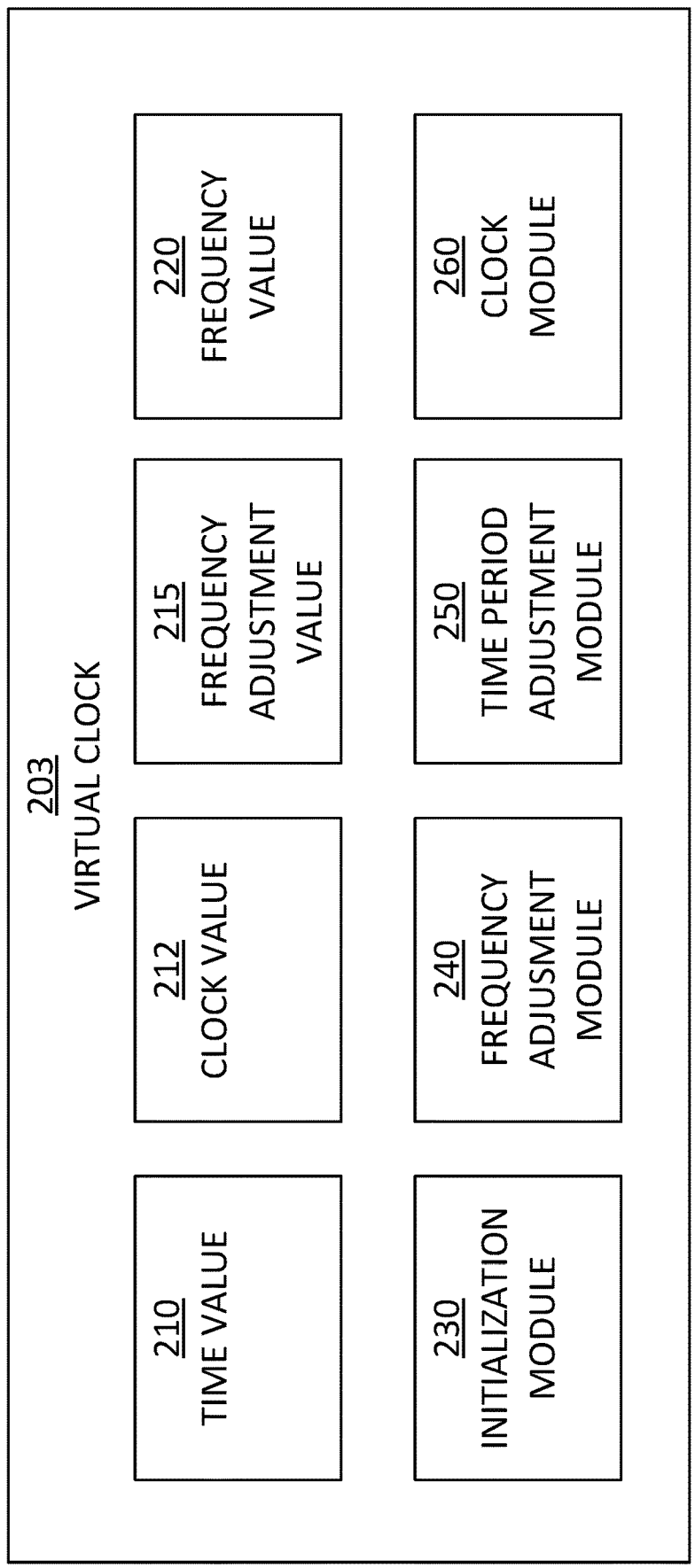
FIG. 2 depicts data elements in a virtual clock 203.

FIG. 2 depicts the data elements and modules of the virtual clock 203. The virtual clock 203 includes a time value 210, a clock value 212, a frequency adjustment value 215 and a frequency value 220. In addition, the virtual clock 203 may include an initialization module 230, a frequency adjustment module 240 and a time period adjustment module 250 and a clock module 260. The initialization module 230 creates initial values for the time value 210, the clock value 212, the increment adjustment value 215 and the frequency 220. The frequency adjustment module 240 determines the frequency adjustment value 215. The time period adjustment module 250 adjusts the clock value 212.

Figure 3:
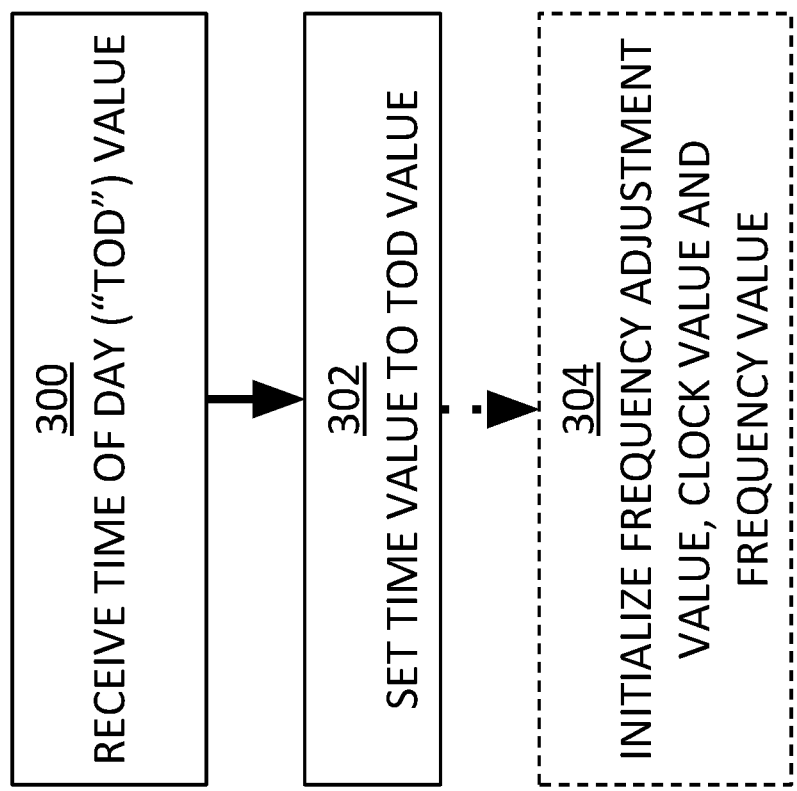
FIG. 3 depicts steps performed by the initialization module 230 to initialize data elements in a virtual clock 203.

FIG. 3 depicts steps performed by the initialization module 230 according to a specific embodiment of the invention. Those skilled in the art will recognize that the steps may be performed in various orders and by multiple modules.

At step 300, the initialization module 230 receives a time of day ("TOD") value from the virtual network protocol stack 202. In most embodiments, the virtual network protocol stack 202 communicates with the network controller 200 to request and receive a TOD value.

At step 302, the initialization module 230 sets the time value 210 to the received TOD value. In some instances, the initialization module 230 communicates with the time period adjustment module 250 to adjust the time value 210 as described below with respect to FIG. 6.

At optional step 304, the initialization module 230 sets the frequency adjustment value 215, the clock value 212 and frequency value 220. In a specific embodiment, the initialization module 230 sets the frequency adjustment value 215 to zero and sets the clock value 212 to zero. In some embodiments, the initialization module 230 sets the frequency value 220 to a 32-bit or a 64-bit fractional value. In a specific embodiment, the initialization module 230 sets the frequency value 220 to a 64-bit fractional value that represents one billionth of a second.

Figure 4:
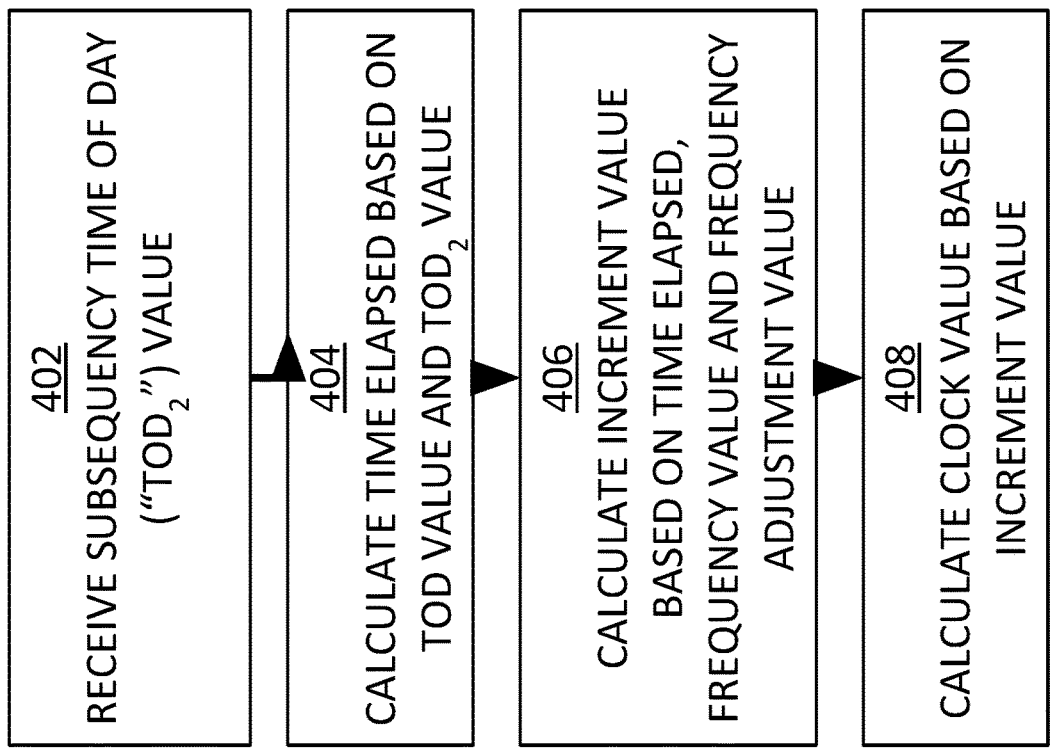
FIG. 4 depicts steps performed by a clock module 260 to calculate a clock value 212.

FIG. 4 depicts steps performed by the clock module 260 to calculate a new time value. Depending on the embodiment, the clock module 260 may perform these steps on a periodic basis or intermittently. As can be appreciated by those skilled in the art, these steps may be performed, in part or in whole, by other modules.

At step 402, the clock module 260 receives a value from the virtual network protocol stack 202. In a specific embodiment, the value is a second time of day value ($TOD_2$). In some embodiments, the clock module 260 queries the virtual network protocol stack 202 to receive the second time of day value. In a specific embodiment, the clock module 260 sends a query to the virtual network protocol stack 202 to receive the second time of day value at a fixed time period (e.g., a second).

At step 404, the clock module 260 uses the received value and the time value 210 to calculate the amount of time elapsed since the last time value. In most embodiments, the clock module 260 subtracts the time value 210 from the received value.

At step 406, the clock module 260 uses the amount of time elapsed to determine an increment value used to increment the clock value 212. In most embodiments, the increment value is calculated by multiplying the amount of time elapsed by the frequency value 220 adjusted by the frequency adjustment value 215. In a specific embodiment, the frequency adjustment value 215 is added to the frequency value 220 or subtracted from the frequency value 220.

At step 408, the clock module 260 adds the increment value to the clock value 212.

Figure 5:
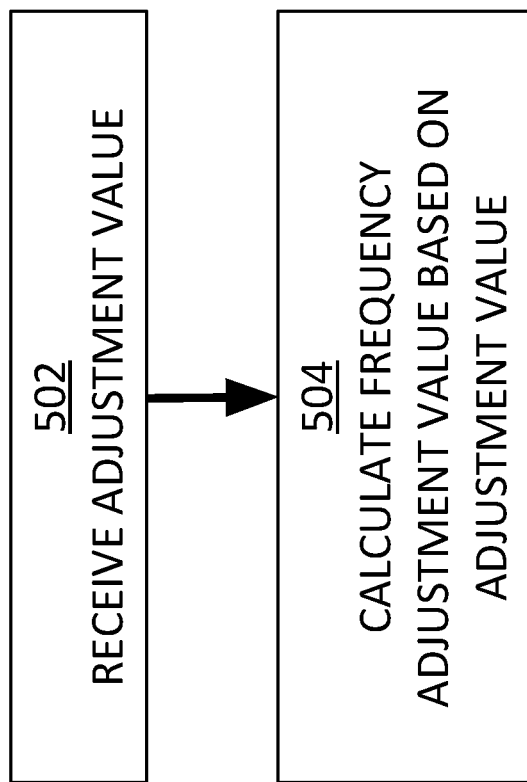
FIG. 5 depicts steps performed by a frequency adjustment module 240 to calculate a frequency adjustment value 215.

FIG. 5 depicts steps performed by the frequency adjustment module 240 to determine the frequency adjustment value 215. As can be appreciated by those skilled in the art, these steps may be performed, in part or in whole, by other modules.

At step 502, the frequency adjustment module 240 communicates with the virtual network protocol stack 202 to receive an adjustment value. In some embodiments, the virtual network protocol stack 202 calculates the adjustment value based on the difference between a time value from a remote master hardware clock (i.e., not associated with the network controller 200) that is broadcasted to the network controller 200 and the clock value 212 that is stored by the virtual clock 203. In some instances, the virtual network protocol stack 202 accounts for delay along the network path from the remote master hardware clock to the network controller 200 in calculate the adjustment value. In a specific embodiment, a Proportional-Integral-Derivative controller loop is used to calculate the clock value 212 stored by the virtual clock 212 and minimize the adjustment value.

At step 504, the frequency adjustment module 240 calculates the frequency adjustment value 215 by multiplying the frequency value 220 by the received adjustment value. In a specific embodiment, the frequency value 220 is expressed as a 64-bit fractional value representing billionths of a second and the frequency adjustment value 215 is calculated by dividing the frequency value 220 multiplied by the received adjustment value by one billion.

Figure 6:
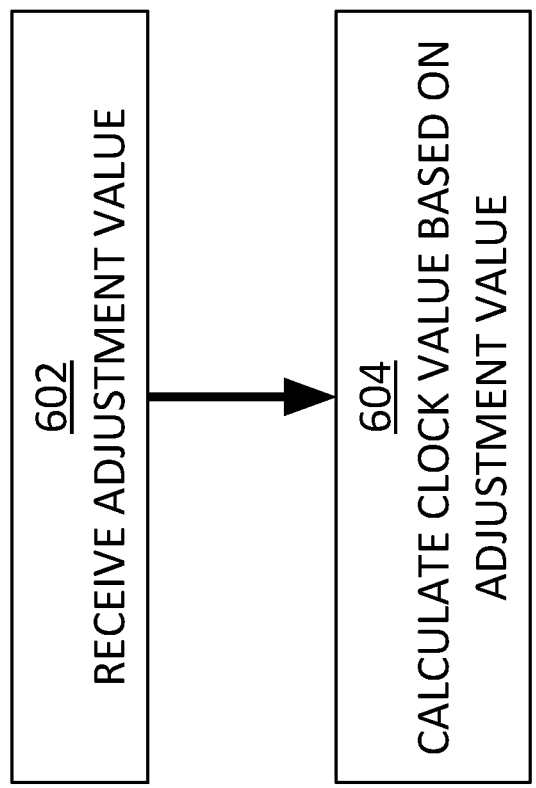
FIG. 6 depicts steps performed by a time period adjustment module 250 to adjust a clock value 212.

FIG. 6 depicts steps performed by the time period adjustment module 250 to adjust the clock value 212.

At step 602, the time period adjustment module 260 receives an adjustment value from the virtual network protocol stack 202. In most embodiments, the adjustment value will be the same adjustment value as described above with respect to step 502.

At step 604, the time period adjustment module 260 adds or subtracts the received adjustment value to the clock value 212.

Although the algorithms described above including those with reference to the foregoing flow charts have been described separately, it should be understood that any two or more of the algorithms disclosed herein can be combined in any combination. Any of the methods, modules, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method of virtualizing a clock, the method executed by a network controller comprising a processor and computer-readable instructions for creating one or more virtual network elements comprising one or more virtual clocks, the method comprising:
   retrieving, at a first virtual network element of the one or more virtual network elements, a first time of day value;
   retrieving, at the first virtual network element of the one or more virtual network elements, a second time of day value;
   calculating an amount of time elapsed between the first time of day value and the second time of day value;
   adjusting the amount of time elapsed based at least in part on a frequency adjustment value, the amount of time elapsed, and a frequency value; and
   incrementing a clock value based on the adjusted amount of time elapsed.

2. The method of claim 1, wherein the virtual network element comprises a virtual network protocol stack that provides the first time of day value and the second time of day value.

3. The method of claim 1, wherein the virtual network protocol stack fully replicates the behavior of a network element.

4. The method of claim 1, further comprising:
   retrieving an adjustment value; and
   calculating a frequency adjustment value based on the adjustment value.

5. The method of claim 3, wherein the frequency adjustment value is stored as a multi-bit fractional value.

6. The method of claim 1, further comprising executing the method of claim 1 on at least one thousand virtual network elements.

7. The method of claim 1, further comprising repeating the method of claim 1 at a fixed time period.

8. The method of claim 7, wherein the fixed time period is a one second interval.

9. A system for virtualizing a clock, the system comprising:
   a network controller comprising a processor and computer-readable instructions executed by the processor for creating one or more virtual network elements, each virtual network element comprising a virtual clock adapted to;
   retrieve a first time of day value;
   retrieve a second time of day value;
   calculate an amount of time elapsed between the first time of day value and the second time of day value;
   adjust the amount of time elapsed based at least in part on a frequency adjustment value, the amount of time elapsed, and a frequency value; and
   increment a clock value based on the adjusted amount of time elapsed.

10. The system of claim 9, wherein the virtual network element further comprises a virtual network protocol stack adapted to provide the first time of day value and the second time of day value to the virtual clock.

11. The method of claim 10, wherein the virtual network protocol stack fully replicates the behavior of a network element.

12. The system of claim 9, wherein the virtual clock is further adapted to:
    retrieve an adjustment value; and
    calculate a frequency adjustment value based on the adjustment value.

13. The system of claim 12, wherein the frequency adjustment value is a fractional value.

14. The method of claim 1, wherein the network controller is adapted to instantiate at least one thousand virtual network elements.

* * * * *